(12) United States Patent
Albrecht et al.

(10) Patent No.: US 6,229,664 B1
(45) Date of Patent: May 8, 2001

(54) HEAD-DISK INTERFACE TESTER WITH OPTICALLY SERVO CONTROLLED ROTARY VOICE COIL MOTOR ACTUATOR

(75) Inventors: Thomas Robert Albrecht; Jenn-Huei Jeffrey Kuan, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/138,847

(22) Filed: Aug. 24, 1998

(51) Int. Cl.[7] .................................................. G11B 5/455
(52) U.S. Cl. ........................ 360/75; 73/865.9; 324/212; 324/262
(58) Field of Search ...................... 360/75, 77.03, 360/78.11; 73/865.9; 324/212, 262; 356/138, 139.05, 140, 141.3

(56) References Cited

U.S. PATENT DOCUMENTS

| | | | |
|---|---|---|---|
| 4,516,177 | 5/1985 | Moon et al. | 360/77.03 X |
| 5,227,625 | 7/1993 | Hetzler | 360/77.03 X |
| 5,268,801 | * 12/1993 | Hazel et al. | 360/77.03 |
| 5,465,182 | * 11/1995 | Ishikawa | 360/75 |
| 5,774,295 | * 6/1998 | Tsai | 360/75 X |

* cited by examiner

*Primary Examiner*—Andrew L. Sniezek
*Assistant Examiner*—James L Habermehl
(74) *Attorney, Agent, or Firm*—Thomas R. Berthold (57) ABSTRACT

A head-disk interface tester for magnetic recording disk drives uses a rotary voice coil motor (VCM) actuator and a rotating laser beam that rotates with the actuator to accurately move the head to the desired position and with the desired velocity. A diode laser is located on the rotating actuator and directs a laser beam through the pivot axis of the actuator. The laser beam is received by a linear position detector. The detector provides position data which is used by control circuitry to move the actuator to the position determined by the user or according to a velocity determined by the user. The rotary VCM actuator is mounted on an adjustable stage that allows the height of the actuator to be varied, as well as the distance between the actuator pivot axis and the spindle motor rotation axis to be varied. The VCM actuator is also removable from its mount so that it can be repositioned to locate the head on either side of the disk center to enable the tester to simulate the head-disk interface of both top and bottom disk surfaces. The tester includes an adjustable load/unload ramp, which together with the pre-selected velocity mode of operation, allows accurate simulation of a wide range of disk drives that load and unload their heads on ramps with a specific velocity.

18 Claims, 7 Drawing Sheets

HEAD-DISK INTERFACE TESTER WITH OPTICALLY SERVO CONTROLLED ROTARY VOICE COIL MOTOR ACTUATOR

TECHNICAL FIELD

This invention relates to head-disk interface testers, also called "spin stands," for testing the head-disk interfaces of magnetic recording disk drives.

BACKGROUND OF THE INVENTION

Head disk interface testers are used in the design and manufacturing of magnetic recording disk drives. Such testers typically include a spindle motor with a removable chuck or clamp that allows a magnetic recording disk to be installed, and an actuator on to which the suspension and magnetic recording head are mounted. The actuator can move the head in a programmed pattern, which may represent a typical seek a pattern during operation of the disk drive, or can maintain the head over a particular region of the disk. The tester is thus able to simulate the operation of the disk drive and enables various mechanical properties of the interface to be determined, including wear of the head and disk, fly height of the slider and "stiction," or static friction which causes the head to stick to the disk. Conventional head disk interface testers use a linear or rotary stepper motor as the actuator. The stepper motor actuator cannot accurately represent the operation of modern disk drives that use a rotary voice coil motor actuator because, unlike actual disk drives, the stepper motor actuator moves in discrete steps and thus represents a relatively jerky motion of the slider across the disk surface. Many modern disk drives use a load/unload ramp located at the other periphery of the disk to support the suspension and head off the disk surface when the disk drive is not operating. The actuator is required to move the suspension up the ramp for loading and down the ramp for unloading with a smooth continuous motion and with a velocity that may vary according to a specific velocity profile. Because of the jerky motion of stepper motors it is difficult for conventional head disk interface testers to precisely simulate the operation of disk drives during the load/unload function.

What is needed is a head-disk interface tester that can accurately simulate the operation of modern disk drives, including providing continuous motion of the sliders over the disk surfaces and up and down load/unload ramps according to various velocity profiles.

SUMMARY OF THE INVENTION

The invention is a head-disk interface tester that uses a rotary voice coil motor (VCM) actuator and a rotating laser beam that rotates with the actuator to accurately move the head to the desired position and with the desired velocity. A diode laser is located on the rotating actuator and directs a laser beam through the pivot axis of the actuator. The laser beam is received by a linear position detector. The detector provides position data which is used by control circuitry to move the actuator to the position determined by the user or according to a velocity determined by the user. The rotary VCM actuator is mounted on an adjustable stage that allows the height of the actuator to be varied, as well as the distance between the actuator pivot axis and the spindle motor rotation axis to be varied. The VCM actuator is also removable from its mount so that it can be repositioned to locate the head on either side of the disk center to enable the tester to simulate the head-disk interface of both top and bottom disk surfaces. The tester includes an adjustable load/unload ramp, which together with the preselected velocity mode of operation, allows accurate simulation of a wide range of disk drives that load and unload their heads on ramps with a specific velocity.

For a fuller understanding of the nature and advantages of the present invention, reference should be made to the following detailed description taken together with the accompanying figures.

DESCRIPTION OF THE PREFERRED EMBODIMENTS

Figure 1:
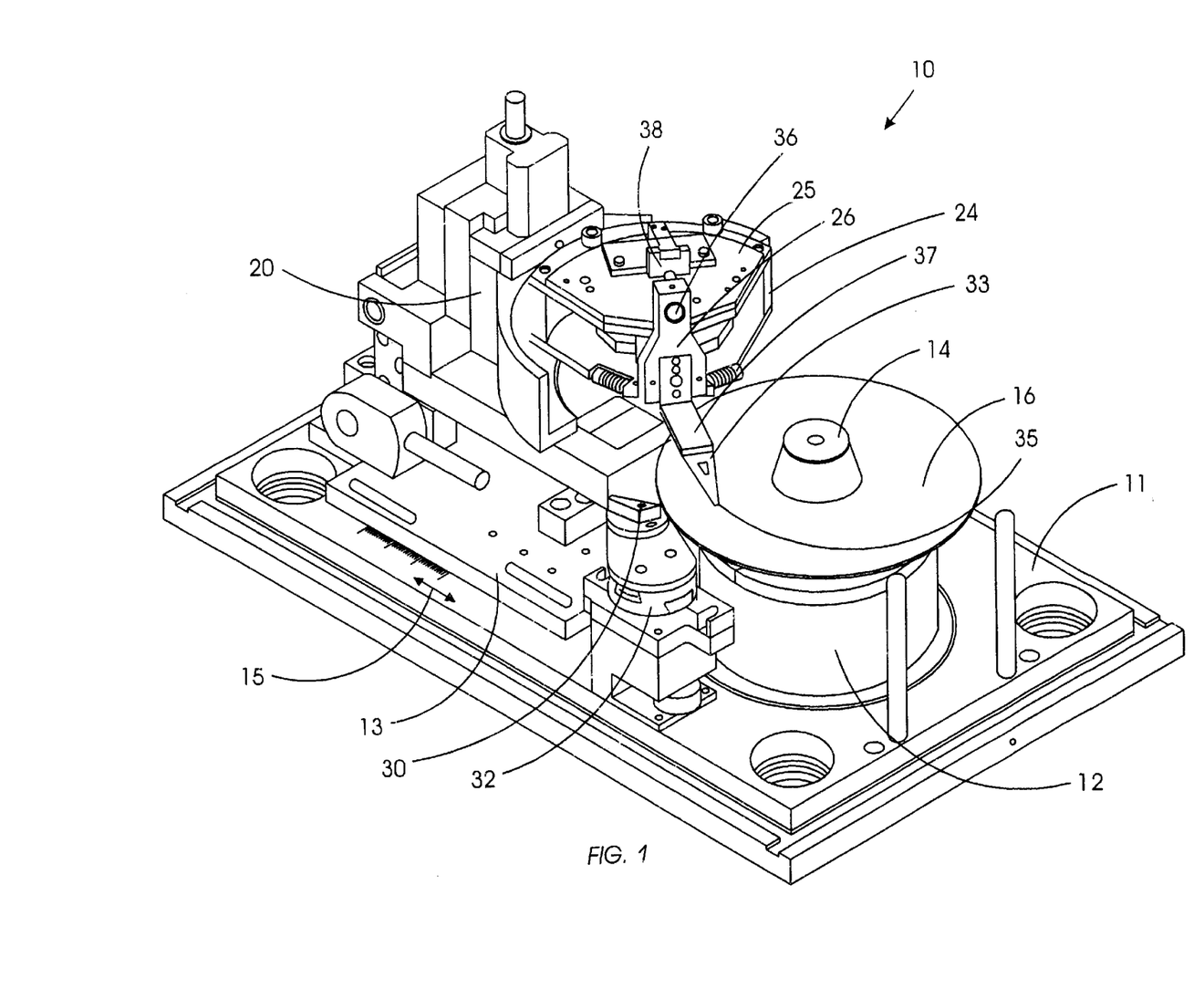
FIG. 1 is an isometric view of the tester.

Referring first to FIG. 1, the head-desk interface tester 10 according to the present invention is illustrated in an isometric view. The tester 10 includes a base 11 which supports a spindle motor 12 and an adjustable actuator stage 13. The spindle motor 12 has a removable disk clamp 14 that enables various types and sizes of disks to be installed on the spindle motor 12. A typical disk 16 to be tested is shown mounted on the spindle motor 12. The actuator stage 13 is movable in the linear direction shown by arrow 15. An adjustable actuator support 20 is mounted on the stage 13. The actuator support includes a height adjustment mechanism that allows the support 20 to be moved in the direction generally perpendicular to the surface of disk 16. A rotary voice coil motor (VCM) actuator assembly 24 is mounted on the actuator support 20. Thus the VCM actuator assembly 24 is adjustable in the direction perpendicular to the surface of disk 16 by the actuator support 20, and in a direction parallel to the surface of disk 16 by the movable actuator stage 13. The actuator stage 13 permits the distance between the actuator pivot axis 43 (FIG. 2) and the spindle motor 12 rotation axis to be varied. This enables the VCM actuator assembly 24 to be located at the precise location relative to the disk 16 to enable true simulation of the disk drive head-disk interface being tested. The VCM assembly also includes a fixed plate 25 that supports a linear position detector or sensor 38 for use in servo controlling the position of the actuator. The tester 10 also includes a load/unload ramp 30 that is mounted on an adjustable ramp support 32. The ramp 30 can be rotated as well as adjusted in height and horizontal position to accurately represent the location of the ramp used in the disk drive being tested.

The VCM assembly 24 includes an arm mounting platform 26 for attachment of the head 35 and suspension 33 assembly that is to be tested. The head/suspension assembly is attached to a custom suspension support 37, which is then mounted on platform 26. The head mounting platform 26 also includes a central bore 34 into which a diode laser 36 is supported. In the present invention the laser beam from diode laser 36 is used together with the linear position sensor 38 to accurately control the position and velocity of the head 35 on the surface of disk 16.

Figure 2:
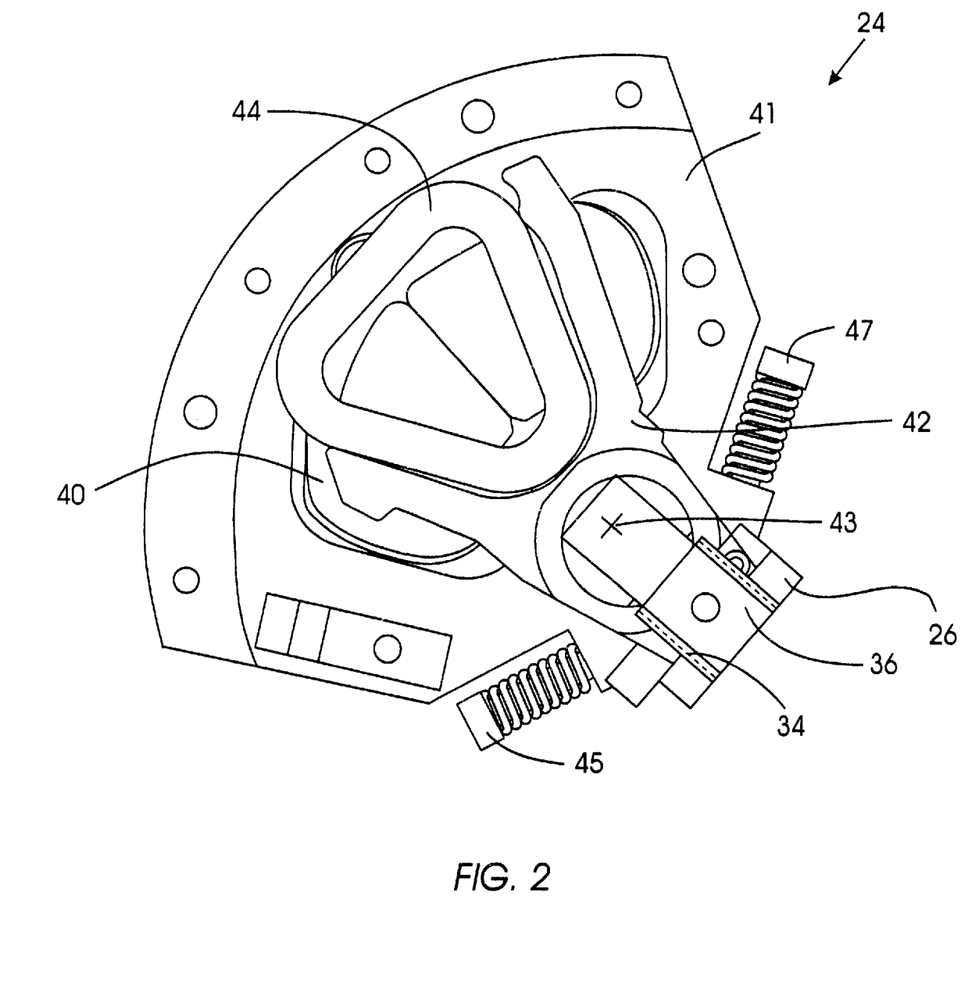
FIG. 2 is a top view of the VCM actuator assembly showing the magnets and coil.

FIG. 2 is a top view of the interior of the VCM assembly 24 with the fixed plate 25 removed to show the fixed VCM magnets 40, 41, the rotatable arm 42 that rotates about pivot axis 43, and the VCM coil 44. The coil 44 is attached to one end of actuator arm 42 and the mounting platform 26 is attached to the other end. FIG. 2 also illustrates the bore 34 (shown in dashed lines) in which the diode laser 36 is located. The VCM assembly 24 also includes a pair of adjustable crash stops 45, 47 that limit the rotational movement of the actuator arm 42.

Figure 3:
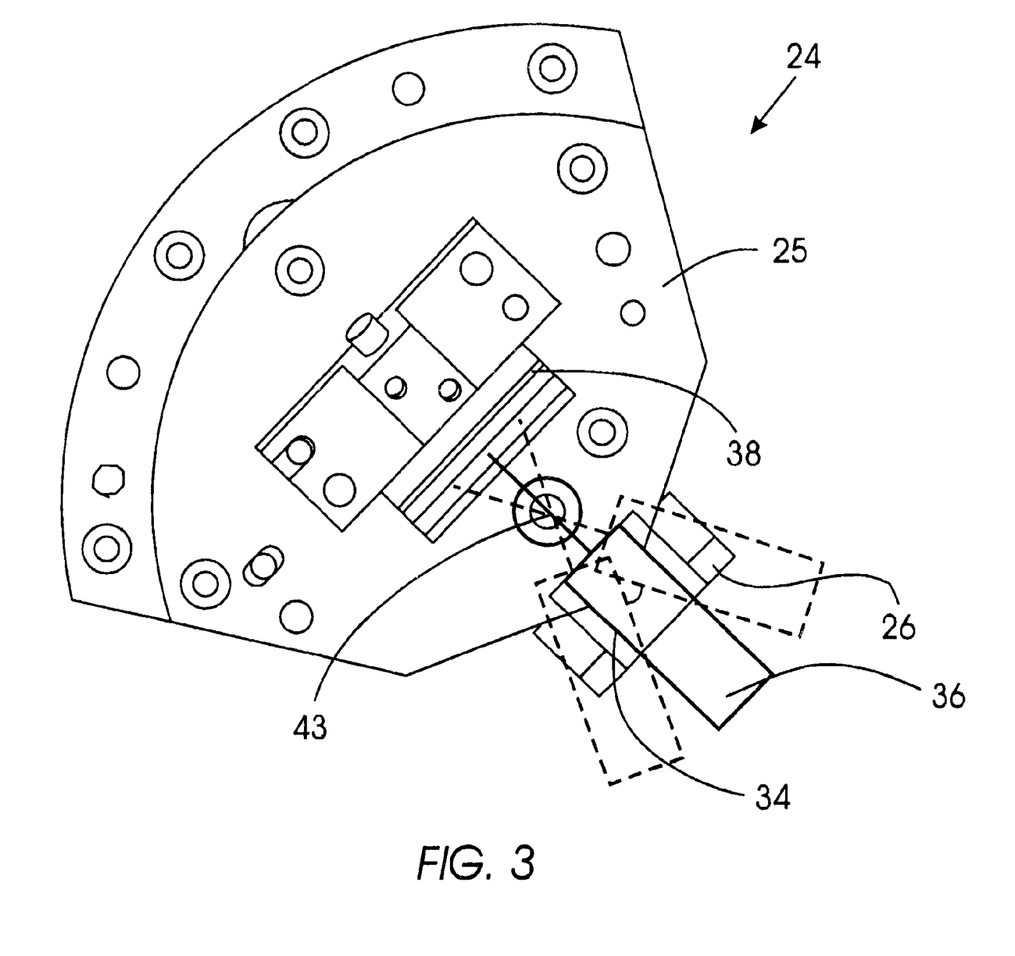
FIG. 3 is a top view of the VCM actuator assembly showing the laser mounted on the rotatable actuator arm and the fixed linear position sensor for detecting the laser beam.

FIG. 3 is a top view of actuator assembly 24 showing the relationship of the diode laser 36 that generates a laser beam that rotates with actuator arm 42 and the linear position sensor 38 that is fixed to the plate 25. The diode laser 36 is positioned in the bore 34 of platform 26 such that the laser beam intersects the pivot axis 43. FIG. 3 shows three angular positions of the actuator arm and illustrates that for all angular positions of the actuator arm 42, the laser beam intersects the actuator pivot axis 43 before it strikes the sensor 38. In an alternative embodiment of the laser and sensor, the laser can be fixed and a planar mirror located on the rotatable portion of the actuator. A planar mirror can be attached to the platform 26 so that the actuator pivot axis intersects the mirror's reflective surface. The diode laser 36 can then be located on the fixed plate 25 with its laser beam directed at the pivot axis. In this embodiment the laser beam would intersect the pivot axis and then be reflected off the planar mirror back to the sensor 38. While the preferred embodiment has the rotating laser beam intersecting the pivot axis 43, this is not a requirement of the present invention. The laser beam could be located off the actuator pivot axis 43, but the output of sensor 38 would then have to be corrected or modified to provide a direct correlation with actuator angular position.

Figure 4:
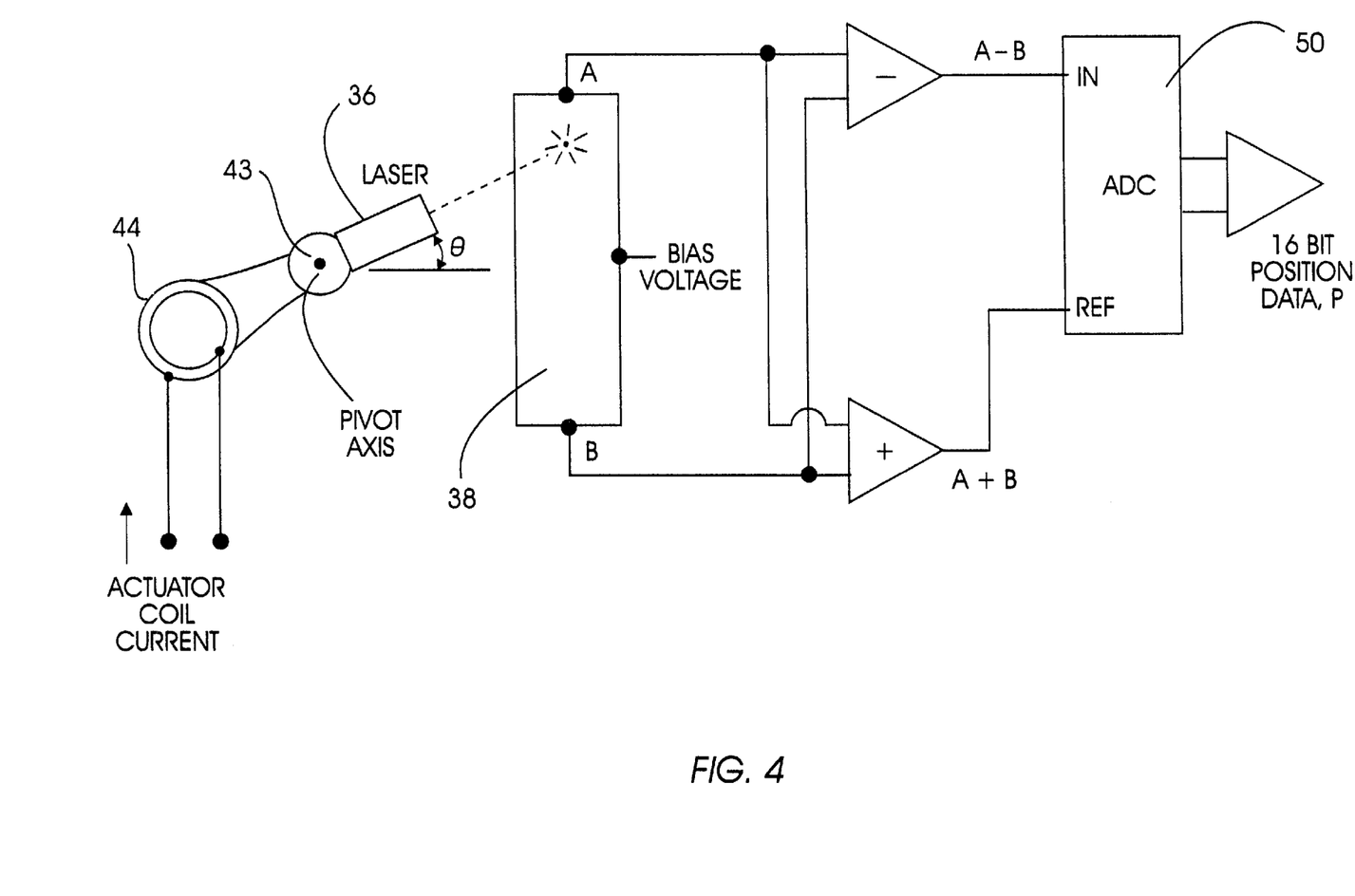
FIG. 4 is a schematic showing the operation of the linear position sensor to generate position data for the control system.

The diode laser 36 and sensor 38 are used to provide head position and velocity control to simulate operation of the disk drive being tested. FIG. 4 is a block diagram showing the manner in which the linear position sensor 38 provides digital position data for the servo control system of the tester 10. In the preferred embodiment the sensor 38 is a model 1L10SP available from SiTek Electro-Optics. The linear position sensor 38 provides two voltage outputs, A and B, relative to a bias voltage. Each of the voltages, A and B, is a measure of the position of the laser spot relative to a respective end of the sensor 38. An analog-to-digital converter (ADC) 50 uses the sum of the voltages (A+B) as its reference (REF) and the difference in the voltages (A−B) as the input (IN). The output of ADC 50 is 16-bit digital position data (P), where P=(A−B)/(A+B). In this manner the output of sensor 38 is normalized to correct for laser intensity variations, because intensity is measured as A+B. For relatively small rotation angles (+/−30 degrees) of the actuator arm 42, the position data P is approximately equal to the rotation angle $\Theta$ because tan $\Theta$ is approximately equal to $\Theta$. If it is desired to provide a precise measurement of $\Theta$, then suitable software can be used to convert or modify the P position values output from ADC 50. In a similar manner, if the rotating laser beam is located off the pivot axis 43, software can be used to convert or modify P to provide a precise measurement of $\Theta$.

Figure 5:
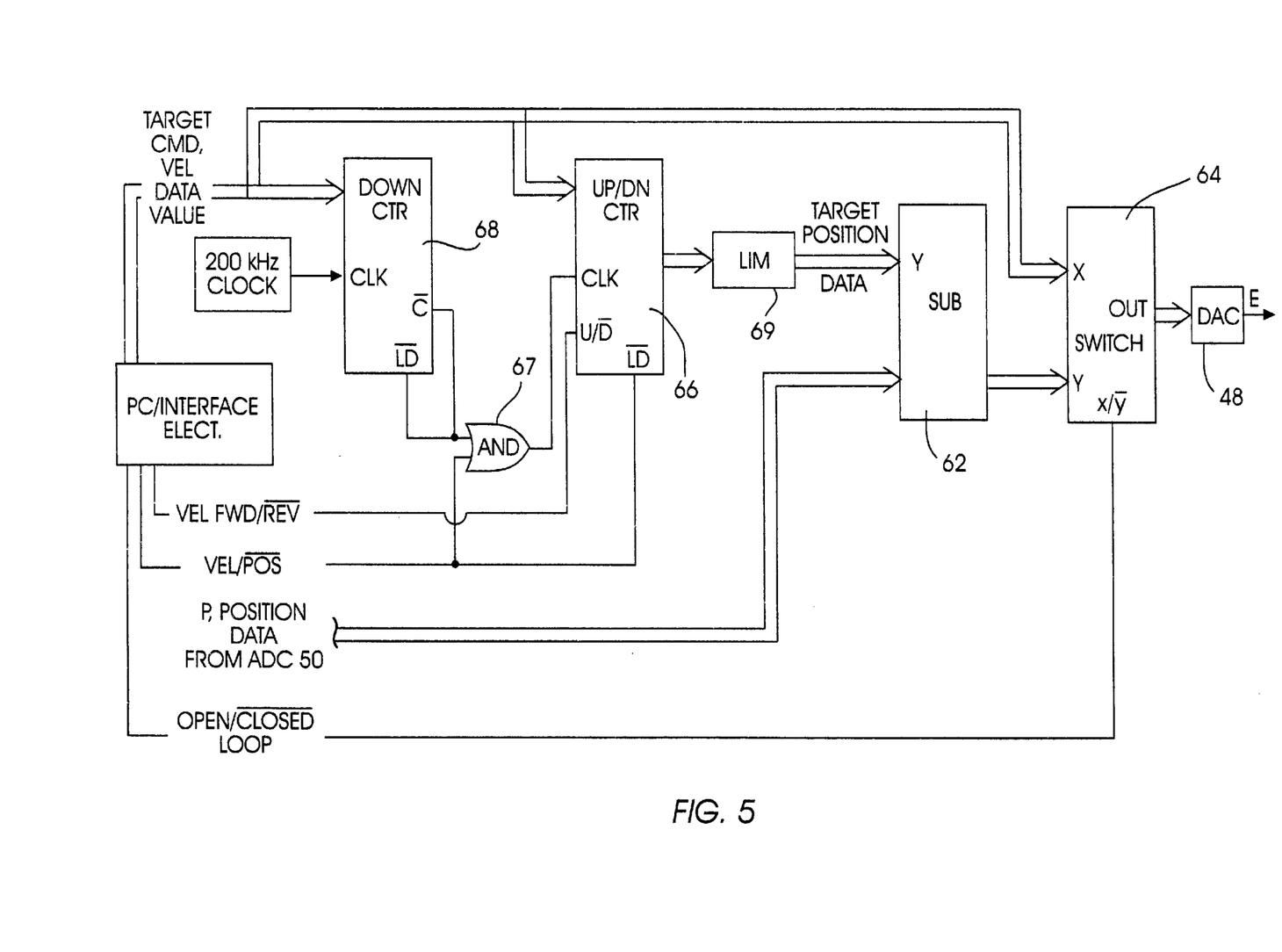
FIG. 5 is a schematic showing the operation of the actuator control system in both position and velocity modes.

FIG. 5 is a block diagram illustrating the operation of the digital control system that uses the position data P from DAC 50 to provide an analog error signal E to control the actuator arm 42, and thus the attached head, to move the head to a desired position or according to a desired velocity profile. The tester is controlled by commands from the user through a host personal computer (PC) and interface electronics. Various commands can be input to the tester, including an open loop command (OPEN/CLOSED LOOP) to indicate whether the actuator is to operate "open loop" or whether the control system is to be activated. If "closed loop" control is selected, then the other inputs to provided to the tester by the user are a mode command (VEL/POS) indicating whether the system is to be in position mode (i.e., the head is to be moved to a target position on the disk) or velocity mode (i.e., the head is to be moved according to a desired velocity across the disk), a velocity forward or reverse signal (VEL FWD/REV) indicating the desired direction of motion of the head, and the command data (CMD) which is the target position.

In "open loop" operation, the switch 64 is set to "X" and the output to DAC 48 is the fixed value of target position CMD that results in a fixed error signal E output. In "closed loop" operation, switch 64 is set to "Y".

In the "position" mode of closed loop operation, the CMD value from the user is directed through up/down counter 66, which is not operating because the VEL/POS value is set to low, indicating that POS mode is selected. Thus the output from up/down counter 66 in position mode is the fixed target position CMD value. The output of subtractor 62 is thus the difference between the CMD target position and the actual position value P. Because switch 64 is set to "Y", this difference results in the analog error signal E output from DAC 48.

In the "velocity" mode of closed loop operation, the VEL/POS is set to high, indicating that the VEL mode is selected. This enables the up/down counter 66 and also sets a high value to one of the inputs to AND gate 67. The down counter 68 functions as a variable frequency pulse generator and counts down from a loaded set value and recycles. With each recycle a clock pulse is sent to AND gate 67, which provides a clock pulse to up/down counter 66. The output of counter 66 is the target position. Thus the down counter 68 controls the rate that counter 66 counts. If the loaded data value into down counter 68 is high, then down counter 68 will recycle more slowly and thus the up/down counter 66 will count more slowly than if the loaded data value in down counter 68 were a lower value. The target position value input into subtractor 62 from counter 66 in velocity mode is thus a continuously varying target position value that is varying at the rate determined by the clock input from down counter 68. Because the system can not servo to the extreme ends of the linear position sensor 38 (FIG. 4), a limit circuit 69 limits the high and low values that can be sent to subtractor 62 to provide "headroom" for the servo system. The ability to select various velocities for the actuator by selecting the data value input to counter 68 is especially valuable in testing disk drives that have load/unload ramps. Because the ramp 30 (FIG. 1) can be positioned to a preselected height above disk 16 and to a preselected position relative the perimeter of the disk 16 by use of the adjustable ramp support 32, and because of the ability to select desired head loading and unloading velocities, the tester is able to simulate the head loading and unloading operations of disk drives.

The error signal E output from DAC 48 is sent through a conventional "proportional-integral-differential" (P-I-D) servo compensator, whose output is sent to a conventional current driver. The current driver is essentially a voltageto-current converter, which then supplies the appropriate current to the coil 44 of the actuator.

Figure 6:
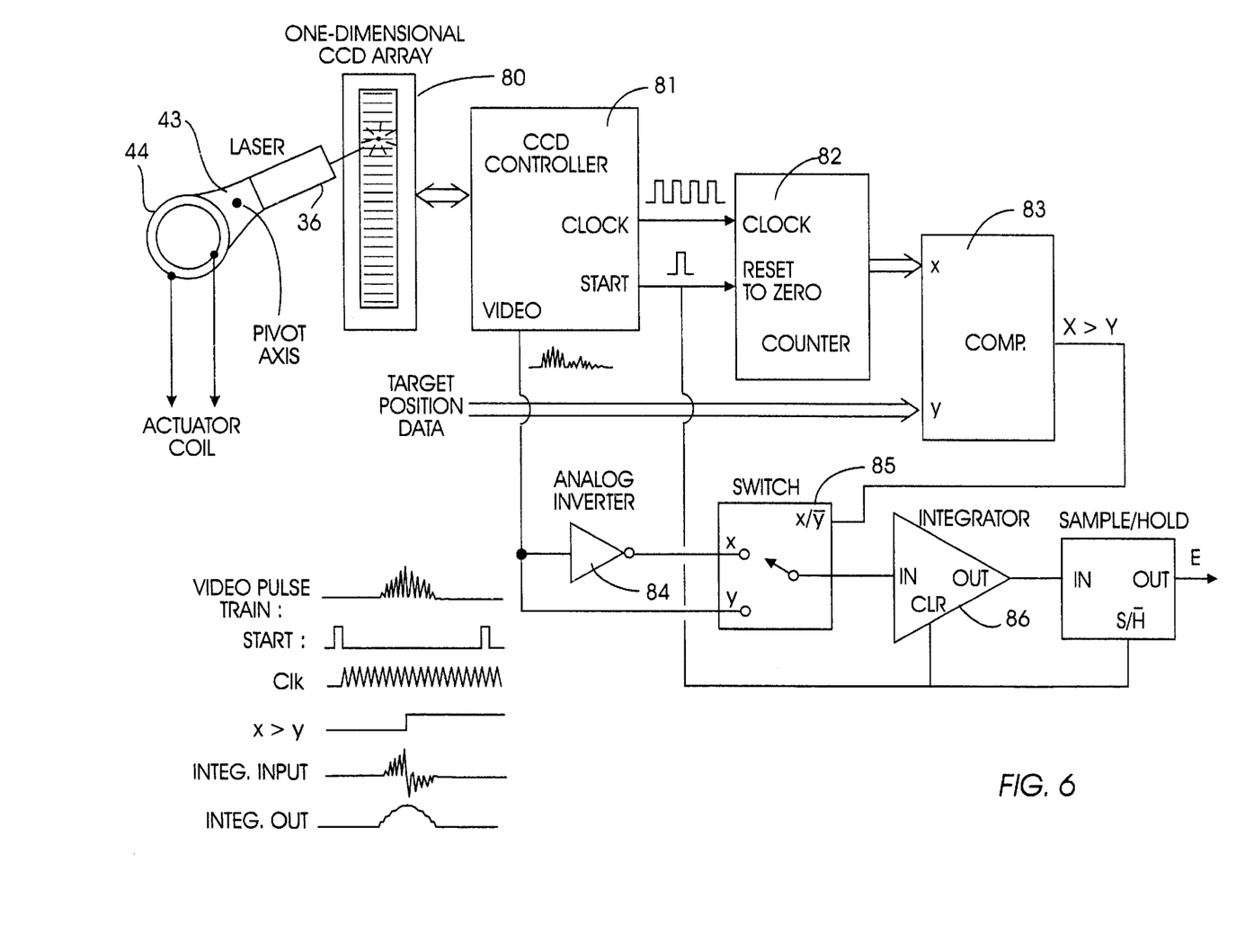
FIG. 6 is a schematic showing operation of an alternative position detector.

FIG. 6 is a block diagram of an alternative control system for use with a one-dimensional charge coupled device (CCD) 80 in place of the linear position sensor 38. The CCD detector 80 is a scanning type device controlled by a conventional CCD controller 81 that provides a video pulse train for each scan. A counter 82 counts clock pulses after the start of a scan and outputs a value X, corresponding to position along the CCD detector 80, to a comparator 83. Comparator 83 outputs a signal whenever X is greater than Y, the target position value. The video signal from CCD controller 81, and an inverted video signal from analog inverter 84, are input to a switch 85. The output of switch 85 is sent to an integrator 86. The switch 85 provides the non-inverted video signal to integrator 86 until the scan exceeds the target position (X>Y), at which time the inverted video signal is sent to integrator 86. The integrator 86 output over the entire scan thus corresponds to the error signal E which is used to drive the VCM driver. If the laser spot is precisely at the location on CCD detector 80 corresponding to the target position, then integration of the inverted video signal followed by integration of the non-inverted video signal will be zero, indicating zero error signal.

Figure 7:
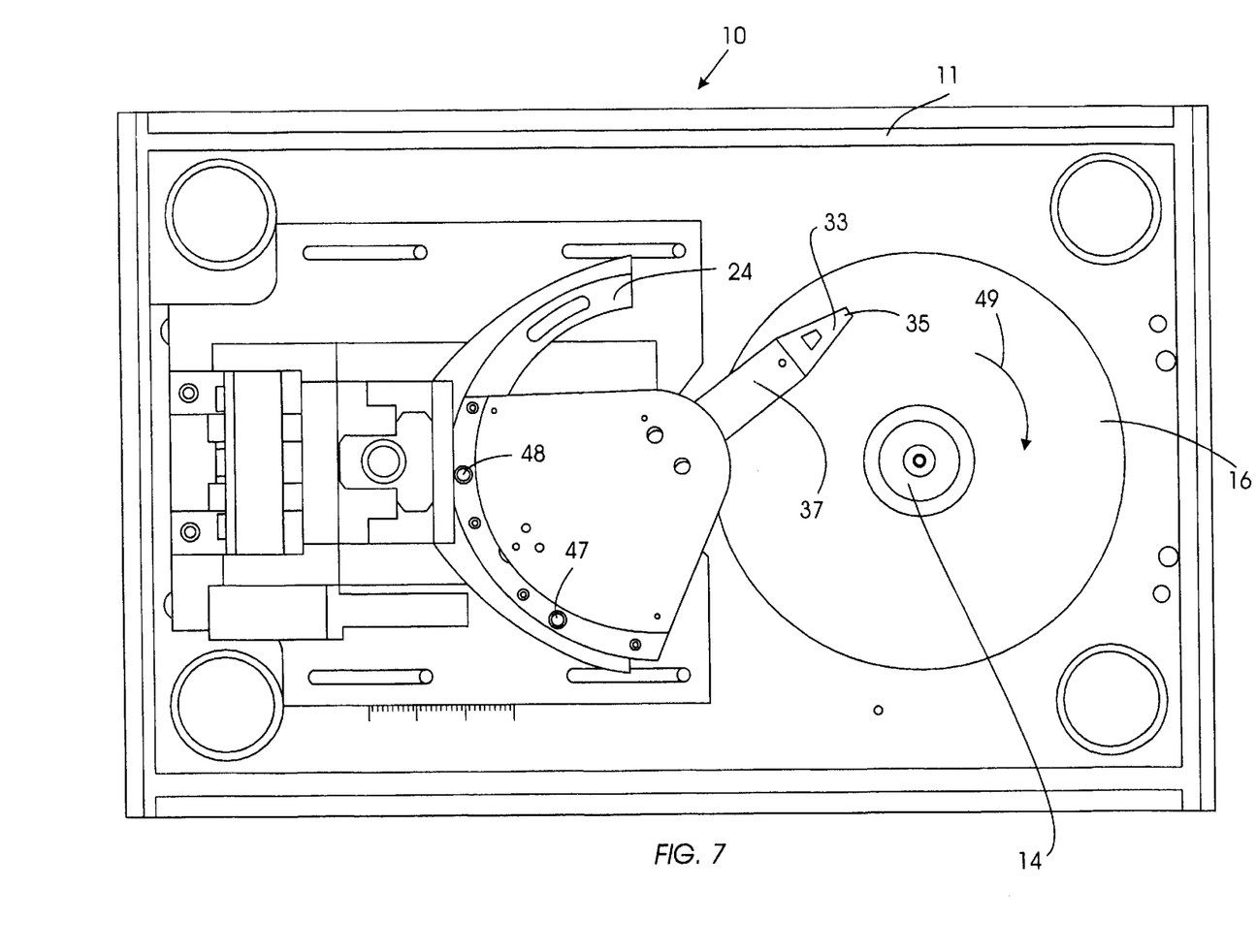
FIG. 7 is a top view of the tester showing a reversed position of the VCM actuator assembly for testing "bottom" head-disk interfaces.

FIG. 7 shows another feature of the tester 10 with adjustable VCM actuator. The VCM actuator assembly 24 is shown mounted in a different position on the actuator support 20 so that the head 35 is located on a different half of disk surface 16 (see FIG. 1 for comparison). The VCM assembly 24 is removed from the support 20 by removal of bolts 47, 48 and re-positioned to the position shown in FIG. 7. In addition, the spindle motor direction of rotation is reversed so that it rotates the disk clockwise, as shown by arrow 49. The ability to reposition the VCM assembly 24 so as to locate the head 35 on the disk surface on either side of disk clamp 14 and to reverse the direction of the spindle motor enables the tester to test "bottom" head/disk interfaces, i.e., those interfaces in disk drives where the bottom surface of each disk has its own associated head that is urged "upward" toward the bottom disk surface by the associated suspension.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A head-disk interface tester for magnetic recording disk drives comprising:
   a base;
   a spindle motor mounted on the base;
   a movable clamp for clamping a magnetic recording disk to the spindle motor;
   a rotary voice coil motor (VCM) actuator assembly comprising a fixed magnet assembly, an actuator arm rotatable about a pivot axis, the arm having an electrical coil on one end for movement through the magnetic field of the magnet assembly and a platform on the other end for mounting a magnetic recording head;
   an adjustable actuator support for supporting the VCM actuator assembly and for locating it in a desired position along a line perpendicular to the plane of the disk;
   an adjustable actuator stage for holding the actuator support and for locating it along a line parallel to the plane of the disk, the adjustable actuator support and actuator stage permitting positioning of the actuator pivot axis relative to the axis of rotation of the spindle motor to represent the head-disk interface of the disk drive to be tested;
   a diode laser for directing a laser beam that rotates as the actuator arm rotates;
   a detector fixed relative to the base for detecting the laser beam; and
   control circuitry responsive to the output of the detector for supplying electrical current to the coil on the end of the actuator arm to thereby move the head in a desired mode across the disk.

2. The tester according to claim 1 wherein the diode laser directs the laser beam through pivot axis of the actuator.

3. The tester according to claim 1 wherein the detector is a one-dimensional charge-coupled device.

4. The tester according to claim 1 wherein the detector is a linear position detector providing an output voltage proportional to the linear position where the laser beam is incident.

5. The tester according to claim 4 wherein the detector provides a first voltage representative of the linear position of the laser beam relative to a first end of the linear detector and a second voltage representative of the linear position of the laser beam relative to the second end of the linear detector, and wherein the control circuitry includes an analog-to-digital converter whose output is a digital position value representative of the difference of the first and second voltages divided by the sum of the first and second voltages.

6. The tester according to claim 5 wherein the control circuitry includes a controller providing a digital target value representative of the target position on the disk where the head is to be positioned and a digital-to-analog converter that provides an error signal representative of the difference between the target value from the controller and the position value.

7. The tester according to claim 1 wherein the control circuitry includes a controller providing a signal to move the head across the disk according to a fixed target position mode or a velocity mode.

8. The tester according to claim 1 wherein the diode laser is attached to the rotatable actuator arm and directs the laser beam along a line parallel to the plane of the disk.

9. The tester according to claim 1 further comprising a planar mirror mounted on the rotatable actuator arm with the actuator pivot axis aligned substantially in the reflective planar surface of the mirror, and wherein the diode laser is mounted on the nonrotatable portion of the actuator assembly.

10. The tester according to claim 1 wherein the VCM actuator assembly is removable from the actuator support, whereby the VCM actuator assembly may be repositioned to locate the head on the disk surface on either side of the disk clamp.

11. The tester according to claim 1 further comprising a load/unload ramp mounted to the base.

12. The tester according to claim 11 further comprising an adjustable support located between the ramp and the base.

13. A head-disk interface tester for magnetic recording disk drives comprising:
   a base;
   a spindle motor mounted on the base;
   a movable clamp for clamping a magnetic recording disk to the spindle motor;

a rotary voice coil motor (VCM) actuator assembly comprising a fixed magnet assembly, an actuator arm rotatable about a pivot axis, the arm having an electrical coil on one end for movement through the magnetic field of the magnet assembly and a platform on the other end for mounting a magnetic recording head;

an adjustable actuator support for supporting the VCM actuator assembly and for locating it in a desired position along a line perpendicular to the plane of the disk;

an adjustable actuator stage for holding the actuator support and for locating it along a line parallel to the plane of the disk, the adjustable actuator support and actuator stage permitting positioning of the actuator pivot axis relative to the axis of rotation of the spindle motor to represent the head-disk interface of the disk drive to be tested;

a diode laser for directing a laser beam through the pivot axis as the actuator arm rotates;

a linear position detector fixed relative to the base for providing a first voltage representative of the linear position of the laser beam relative to a first end of the linear detector and a second voltage representative of the linear position of the laser beam relative to the second end of the linear detector; and control circuitry responsive to the output of the detector for supplying electrical current to the coil on the end of the actuator arm to thereby move the head in a desired mode across the disk, the control circuitry including an analog-to-digital converter providing a digital position value representative of the difference of the first and second detector voltages divided by the sum of the first and second detector voltages, a controller providing a digital target value representative of the target position on the disk where the head is to be positioned, and a digital-to-analog converter that provides an error signal representative of the difference between the target value from the controller and the position value from the analog-to-digital converter.

14. The tester according to claim 13 wherein the diode laser is attached to the rotatable actuator arm and directs the laser beam along a line generally parallel to the plane of the disk.

15. The tester according to claim 13 further comprising a planar mirror mounted on the rotatable actuator arm with the actuator pivot axis aligned substantially in the reflective planar surface of the mirror, and wherein the diode laser is mounted on the nonrotatable portion of the actuator assembly.

16. The tester according to claim 13 wherein the VCM actuator assembly is removable from the actuator support, whereby the VCM actuator assembly may be repositioned to locate the head on the disk surface on either side of the disk clamp.

17. The tester according to claim 13 further comprising a load/unload ramp and a ramp support mounted to the base, the ramp support being adjustable in directions generally perpendicular to the surface of the disk and parallel to the surface of the disk, whereby the ramp may be located in a preselected position relative to the disk to simulate the disk drive being tested.

18. The tester according to claim 17 wherein the control circuitry includes velocity mode circuitry for moving the head up or down the ramp with a preselected velocity.

* * * * *